A. B. CATTERALL.
DUST CAP.
APPLICATION FILED MAR. 30, 1920.
1,423,515.  Patented July 25, 1922.
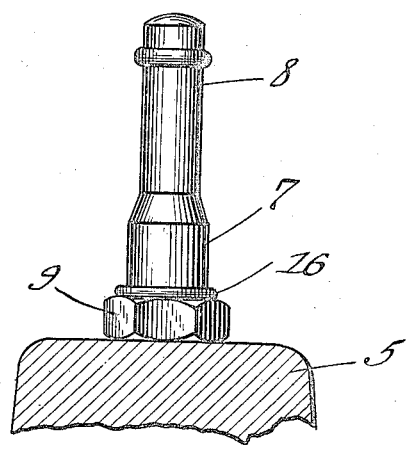
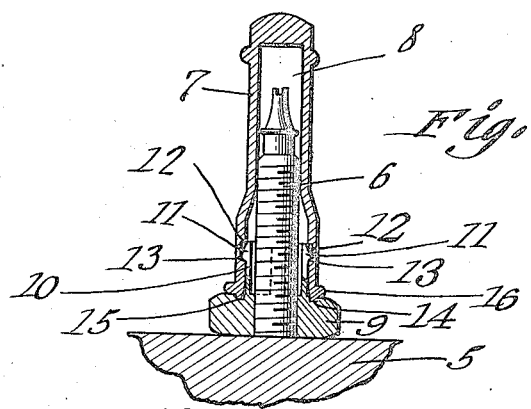
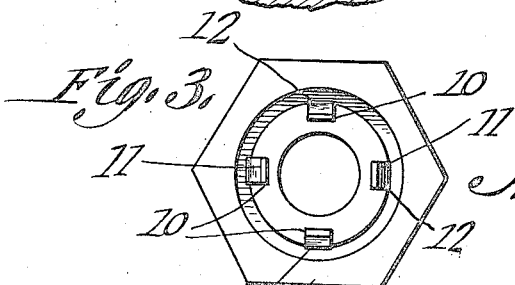
A. B. Catterall
Inventor

UNITED STATES PATENT OFFICE.

ALBERT B. CATTERALL, OF OTTUMWA, IOWA.

DUST CAP.

1,423,515.  Specification of Letters Patent.  Patented July 25, 1922.

Application filed March 30, 1920. Serial No. 369,976.

*To all whom it may concern:*

Be it known that I, ALBERT B. CATTERALL, a citizen of the United States, residing at Ottumwa, in the county of Wapello and State of Iowa, have invented a new and useful Dust Cap, of which the following is a specification.

This invention relates to pneumatic tire valves, and more particularly to the construction of the dust cap thereof.

The primary object of the invention is to provide a dust cap which may be readily and easily connected and disconnected from the valve stem associated therewith.

A further object of the invention is to provide frictional securing means for securing the dust cap to its stem, the friction means adapted to operate automatically when the dust cap is forced over the valve stem.

A still further object of the invention is to provide means to insure a dust proof connection between the cap and valve stem to insure against dust entering at the base of the dust cap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a fragmental sectional view of a rim provided with a dust cap constructed in accordance with the present invention.

Figure 2 illustrates a longitudinal sectional view through the dust cap, and

Figure 3 illustrates a plan view of the securing nut.

Referring to the drawing in detail, the reference character 5 designates a portion of a wheel rim through which a valve stem extends, the stem being threaded and indicated by the reference character 6.

The cap, forming the subject matter of the present invention, comprises a substantially tubular element 7, provided with a reduced portion 8 of a diameter to accommodate the upper extremity of the stem 6 which the cap covers, the lower end of the cap being slightly larger than the upper portion thereof for purposes to be hereinafter more fully described.

The securing nut 9 is internally threaded so that the same may be positioned over the usual threaded stem, and as shown in Figure 2 of the drawing, this securing nut 9 is moved to a position to contact with the inner surface of the rim 5.

Formed integral with the securing nut 9, are the fingers 10, which are relatively long, the same being formed of resilient metal so that the fingers may move laterally. These fingers 10 are supported in suitable spaced relation with each other, and are provided with enlargements 11 disposed adjacent the upper ends thereof, the enlargements 11 having inclined surfaces indicated at 12 adapted to fit behind an annular shoulder 13, formed within the lower end of the dust cap.

An annular groove 14 is formed in one surface of the securing nut 9, the groove being provided to accommodate the flange 15 forming the lower edge of the cap proper, there being an annular shoulder 16 formed exteriorly of the cap, at a point in close proximity to the lower edge thereof, which shoulder contacts with the upper surface of the securing nut 9 for restricting movement of the cap 7 longitudinally of the stem 6.

The inner surface of the dust cap, is curved from a point adjacent to the open end thereof to one edge of the shoulder 13, so that a camming action is set up between the enlargements 11, and more particularly the inclined surfaces 12 thereof, for camming or moving the fingers 10 towards each other when the cap 7 is being positioned thereover.

From the foregoing it is obvious that to position a cap constructed in accordance with the present invention, it is only necessary to insert the cap over the stem associated therewith, with the result that the fingers are moved inwardly until the same reach the shoulder 13 formed within the cap proper. The enlargements 11, due to the resiliency of the fingers 10, are moved behind the shoulder 13 to secure the cap to the stem.

When the cap is in this position, it is obvious that flange 15 is positioned in the annular groove 14 with the result that a dust proof connection is formed at this point. To remove the cap, the cap is grasped by the operator and forced from its seat, the fingers 10 moving towards each other under the pressure, to release the cap.

Having thus described the invention, what I claim as new is:—

In combination with a valve stem, a securing nut positioned on the valve stem and having resilient upwardly extending fingers, said fingers having enlargements, said nut having an annular groove, a cap of a diameter to engage the valve stem, said cap having an enlarged lower portion providing a clearance for the fingers and having a flange formed at its end, said flange adapted to be fitted in the annular groove, said cap having a groove providing a shoulder disposed in spaced relation with the lower end of the cap, said shoulder adapted to cooperate with the enlargements of the fingers, for forcing the flange of the dust cap into the annular groove of the securing nut, and an annular shoulder formed adjacent to the base of the cap to restrict movement of the cap with respect to the securing nut.

In testimony that I claim the foregoing as my own, I have hereto affixed my signature in the presence of two witnesses.

ALBERT B. CATTERALL.

Witnesses:
WILLIAM GORDON,
C. D. DULIN.